JOHN E. MOORE.
Improvement in Bee Hives.
No. 123,924. Patented Feb. 20, 1872.
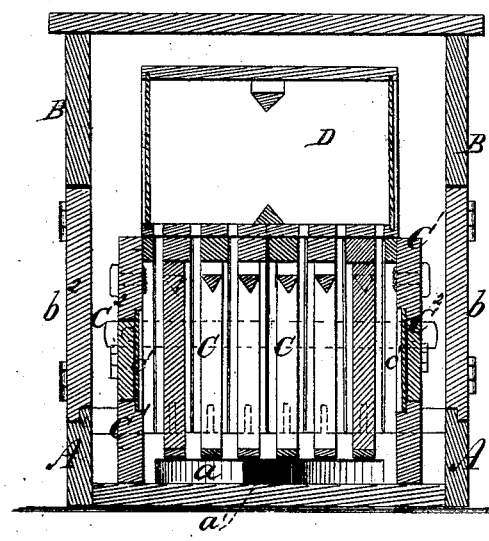
Fig. 1.
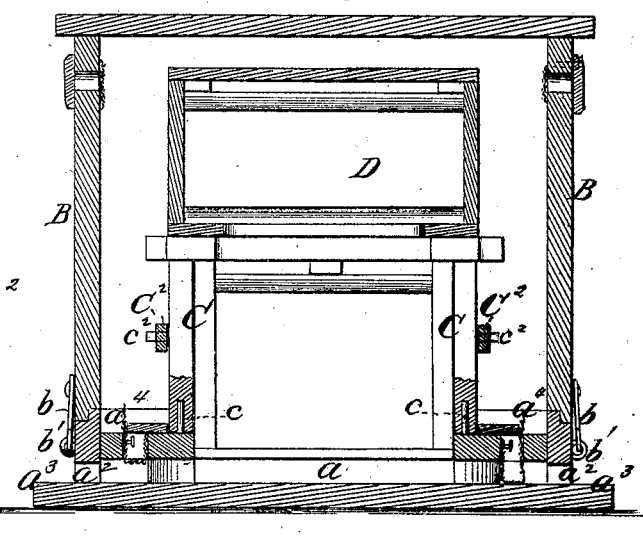
Fig. 2.
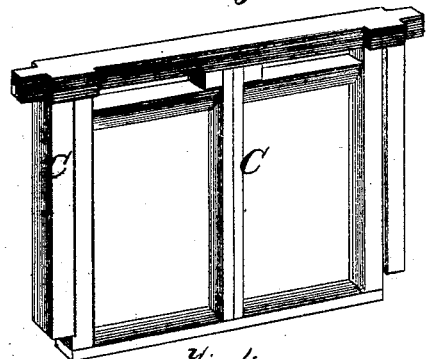
Fig. 3.
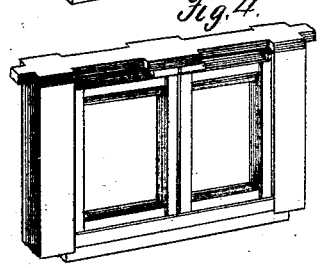
Fig. 4.
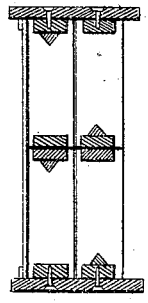
Fig. 5.
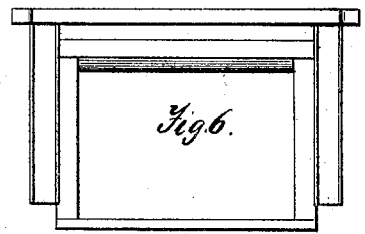
Fig. 6.
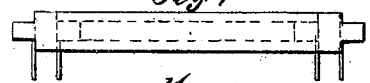
Fig. 7.
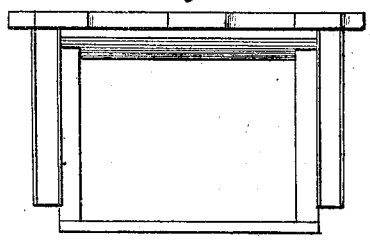
Fig. 8.
Fig. 9.
Fig. 10.
Witnesses.
A. Ruppert
J. William Maier
Inventor.
John E. Moore
Edson Bros.
Attorneys
AM. PHOTO-LITHOGRAPHIC CO. N.Y. (OSBORNE'S PROCESS.)

UNITED STATES PATENT OFFICE.

JOHN E. MOORE, OF BRIDGEWATER, PENNSYLVANIA.

IMPROVEMENT IN BEE-HIVES.

Specification forming part of Letters Patent No. 123,924, dated February 20, 1872.

*To all whom it may concern:*

Be it known that I, JOHN E. MOORE, of Bridgewater, in the county of Beaver and State of Pennsylvania, have invented a certain new and useful Improvement in Bee-Hives; and I do hereby declare the following to be a full, clear, and exact description thereof, reference being had to the accompanying drawing forming a part of the same, and in which—

Figure 1 represents a vertical section of my improved bee-hive taken through the dotted line $x\ x$ of Fig. 2, and Fig. 2 a similar view thereof through the dotted line $y\ y$ of Fig. 1. Fig. 3 is a perspective view of one of the comb-frames detached from the hive, and the remaining figures, marked, respectively, 4, 5, 6, 7, 8, 9, 10, modifications thereof, and a sectional view of honey-box.

Similar letters in the several figures refer to like parts.

This invention has reference to an improved bee-hive; and it consists of the parts of which it is constituted when constructed, combined, and arranged to operate substantially as hereinafter described and claimed.

To enable others to make and use my invention, I will proceed to describe it.

In the annexed drawing, A refers to the base, which is supplied with chamber $a\ a$, communication with which and the internal part of the hive or the comb-frames is had by the bees through the openings $a^1$, (see Fig. 1,) and entrance thereto through the openings $a^2\ a^2$, where the alighting platforms $a^3\ a^3$ for the bees are located. The bee entrances $a^2\ a^2$ are supplied with cut-offs or doors $a^4\ a^4$. B refers to the house or case fitting down upon the base A, and secured thereto by hooks and eyes or staples $b\ b\ b^1\ b^1$. The case B is provided with doors $b^2\ b^2$. C C refer to a series of comb-frames, such as are constructed as shown in Fig. 3. The lower ends of the short arms or pendants of the frames are supplied with holes to receive upright metallic pins $c\ c$ for holding them in position in the hive. The end boards $C^1\ C^1$ having the doors $c^1\ c^1$ are supplied with metallic pins or projections $c^2\ c^2$, which enter apertures made in the bars or clamps $C^2\ C^2$ for firmly holding the comb-frames together.

Fig. 4 shows a comb-frame with the central partition of the comb-frame represented in Fig. 3 dispensed with, and having two small or additional comb-frames held within it by a block or other suitable means, the object of which small frames being to permit of the honey being removed in small quantities.

Fig. 6 and 7 illustrate the comb-frames last referred to with its small frames and the means for retaining the latter therein removed, and supplied with metallic right-angular plates so attached thereto as to receive the abutting portions of its fellow comb-frame, for the purpose of preventing the bees from attaching the honey-comb to the two or any two of the said comb-frames, whereby any one of them may be removed with its contents without disturbing its fellow.

Figs. 8 and 9 exhibit a modification of Figs. 6 and 7. The honey-box, which is designated in Figs. 1 and 2 by the letter D and of the construction therein exhibited, is also constructed as shown in Fig. 5, by which it will be seen that the one shown in the figures first mentioned is divided into four apartments, and supplied with means for assisting the bees in attaching the comb-frame to the walls of the honey-box. The dividing of the box into small apartments is to allow of the honey being gathered in small quantities or combs.

Fig. 10 shows a clamp which, when used, is designed to fit down over the reduced ends of the two end comb-frames, and to take the place of the clamps or bars $C^2\ C^2$.

Having thus described my invention, what I claim, and desire to secure by Letters Patent, is—

The comb-frame C, constructed substantially as herein shown, and supplied with flanges or plates, as described, and for the purpose set forth.

In testimony whereof I have hereunto signed my name in presence of two subscribing witnesses this 21st day of July, A. D. 1871.

JOHN E. MOORE.

Witnesses:
JAS. N. MOORHEAD,
JOSEPH BEAMER.